(12) United States Patent
Ahmad

(10) Patent No.: US 7,456,514 B2
(45) Date of Patent: Nov. 25, 2008

(54) KINETIC HYDROPOWER GENERATION FROM SLOW-MOVING WATER FLOWS

(75) Inventor: Jameel Ahmad, Forest Hills, NY (US)

(73) Assignee: Verdant Power, Arlington, VA (US)

(*) Notice: Subject to any disclaimer, the term of this patent is extended or adjusted under 35 U.S.C. 154(b) by 0 days.

(21) Appl. No.: 11/400,281

(22) Filed: Apr. 10, 2006

(65) Prior Publication Data
US 2007/0063520 A1  Mar. 22, 2007

Related U.S. Application Data

(60) Provisional application No. 60/719,181, filed on Sep. 22, 2005.

(51) Int. Cl.
F03B 13/00 (2006.01)
H02P 9/04 (2006.01)

(52) U.S. Cl. ...................................................... 290/54
(58) Field of Classification Search ................ 290/54
See application file for complete search history.

(56) References Cited

U.S. PATENT DOCUMENTS

| | | | | |
|---|---|---|---|---|
| 1,835,018 A | * | 12/1931 | Darrieus | 415/224 |
| 3,339,078 A | * | 8/1967 | Crompton | 290/44 |
| 3,582,667 A | * | 6/1971 | Mayo, Jr. | 290/52 |
| 4,084,918 A | * | 4/1978 | Pavlecka | 415/1 |
| 4,102,599 A | * | 7/1978 | Ziegler | 415/221 |
| 4,120,602 A | * | 10/1978 | Megnint | 415/1 |
| 4,163,904 A | * | 8/1979 | Skendrovic | 290/54 |
| 4,258,271 A | * | 3/1981 | Chappell et al. | 290/54 |
| 4,295,783 A | * | 10/1981 | Lebost | 415/4.4 |
| 4,446,378 A | * | 5/1984 | Martinez Parra | 290/54 |
| 4,468,153 A | * | 8/1984 | Gutierrez Atencio | 405/78 |
| 4,613,279 A | * | 9/1986 | Corren et al. | 415/121.2 |
| 4,648,244 A | * | 3/1987 | Mayo et al. | 60/398 |
| 4,868,408 A | * | 9/1989 | Hesh | 290/52 |
| 5,332,354 A | * | 7/1994 | Lamont | 415/4.2 |
| 5,447,412 A | * | 9/1995 | Lamont | 415/4.2 |
| 5,451,137 A | * | 9/1995 | Gorlov | 415/7 |
| 5,451,138 A | * | 9/1995 | Istorik et al. | 415/53.1 |
| 5,577,882 A | * | 11/1996 | Istorik et al. | 415/53.1 |
| 6,109,863 A | * | 8/2000 | Milliken | 415/1 |
| 6,382,904 B1 | * | 5/2002 | Orlov et al. | 415/4.5 |
| 6,472,768 B1 | * | 10/2002 | Salls | 290/54 |
| 6,877,968 B2 | * | 4/2005 | Godsall et al. | 418/268 |
| 6,932,541 B2 | * | 8/2005 | McFarland | 405/79 |
| 6,954,006 B2 | * | 10/2005 | Williams, Jr. | 290/54 |

(Continued)

OTHER PUBLICATIONS

Eric Weisstein's World of Physics, http://scienceworld.wolfram.com/physics/FroudeNumber.html.*

(Continued)

Primary Examiner—Nicholas Ponomarenko
Assistant Examiner—Pedro J Cuevas
(74) Attorney, Agent, or Firm—Davidson Berquist Jackson & Gowdey LLP

(57) ABSTRACT

A power generation flume for use with fluid or water flow channels that includes an acceleration zone where a power generation system can be used in an accelerated flow to generate power in a cost efficient manner. The flume can have a variety of dimensions and can be used at one or at multiple locations along or across the flow channel without effecting upstream flow conditions.

25 Claims, 12 Drawing Sheets

U.S. PATENT DOCUMENTS

| | | | | |
|---|---|---|---|---|
| 6,955,049 | B2* | 10/2005 | Krouse | 60/641.7 |
| 7,116,005 | B2* | 10/2006 | Corcoran, III | 290/43 |
| 7,228,750 | B2* | 6/2007 | Brandt, Jr. | 73/861.63 |
| 7,296,411 | B2* | 11/2007 | Segota et al. | 60/770 |
| 7,326,001 | B2* | 2/2008 | McFarland | 405/79 |
| 2002/0178837 | A1* | 12/2002 | Brandt, Jr. | 73/861.63 |
| 2003/0198515 | A1* | 10/2003 | McFarland | 405/79 |
| 2004/0070210 | A1 | 4/2004 | Johansen et al. | 290/43 |
| 2004/0074313 | A1* | 4/2004 | Brandt, Jr. | 73/861.63 |
| 2004/0101397 | A1* | 5/2004 | Godsall et al. | 415/3.1 |
| 2005/0099012 | A1* | 5/2005 | Williams, Jr. | 290/54 |
| 2005/0207845 | A1* | 9/2005 | McFarland | 405/79 |
| 2005/0241413 | A1* | 11/2005 | Brandt, Jr. | 73/861.63 |
| 2006/0026746 | A1* | 2/2006 | McFarland | 4/491 |
| 2008/0101867 | A1* | 5/2008 | McLaughlin | 405/83 |
| 2008/0107486 | A1* | 5/2008 | McFarland | 405/79 |

OTHER PUBLICATIONS

Encyclopedia Britanica, http://www.britannica.com/eb/article-9035514/Froude-number.*

Search Report and Written Opinion from International Application No. PCT/US2006/037082 mailed Apr. 24, 2007.

* cited by examiner

KINETIC HYDROPOWER GENERATION FROM SLOW-MOVING WATER FLOWS

RELATED APPLICATION

This application is related to and claims priority to U.S. Provisional Application No. 60/719,181, filed on Sep. 22, 2005, which is commonly owned with the present application. The entire contents of that application are incorporated herein by reference.

FIELD OF THE INVENTION

This relates to the field of power generation and particularly to the generation of power from slow moving fluid flows.

BACKGROUND AND INTRODUCTION

The present invention concerns both the apparatus for and a method of generating power in slow moving fluid streams, and particularly as a part of a free-flow, dam-less, hydropower generation system.

In the past few years, researchers at Marine Current Turbines Ltd. in the United Kingdom have deployed a demonstration unit to generate power from tidal flows. In Italy, trials using cross-axis turbines have demonstrated the feasibility of generating power from tides in the Messina straits. However, no commercial installations have yet been deployed.

The need for power is on the increase and this need influences the feasibility of generating electricity using cost-effective techniques, from a variety of water sources and especially from non-tidal, direct flowing waters in man-made canals, aqueducts, tailraces, diversion channels, or other fluid flow channels, is very desirable. The driving impetus for this undertaking is the recognition that there exists an enormous, worldwide potential for the conversion of kinetic energy existing in the water moving in canals, aqueducts, tailraces, diversion channels, or other fluid flow channels, into useful hydroelectric power. At the present time this potential for power generation remains untapped.

The present invention addresses the unique challenges inherent in the cost-effective extraction of hydroelectric power from slow moving waters, especially in man-made conveyance systems. First and foremost, since the primary function of these water conveyance systems is the conveyance of water for drinking or irrigation purposes, it is imperative that the installation and operation of a power generation facility in these slow moving waterways must not have an adverse impact on their capability to deliver water in a desired flow and at an expected quality. In the past, power generation or power output from relatively low flow or low velocity fluid flow channels, designed to operate at slow speeds to prevent scour or turbulence in the channel, was viewed as being too small to be cost-effective. What the present invention recognizes is that the otherwise slow flow velocities can be accelerated in the waterways beyond a lower threshold limit, and specifically at a designed location, or power generation zone, along the waterway where the kinetic hydropower system will be installed.

The present invention is based upon a design philosophy and criteria for a flume system that will accomplish this objective cost effectively, and without adversely impacting the primary function of these waterways, i.e., to convey water for drinking or irrigation purposes.

A vertical-axis turbine candidate technology is identified and briefly evaluated for potential deployment in the flume-enhanced flows of canals, aqueducts, tailraces, diversion channels, and other fluid flow channels to generate power cost-effectively. For example, a vertical axis, 6-ft diameter system, deployed in conjunction with a flume according to the present invention, can generate more than 20 KW in a typical 20 foot wide open channel environment.

DESCRIPTION OF ONE OR MORE PREFERRED EMBODIMENTS

Open Channel Hydraulics

Figure 1:
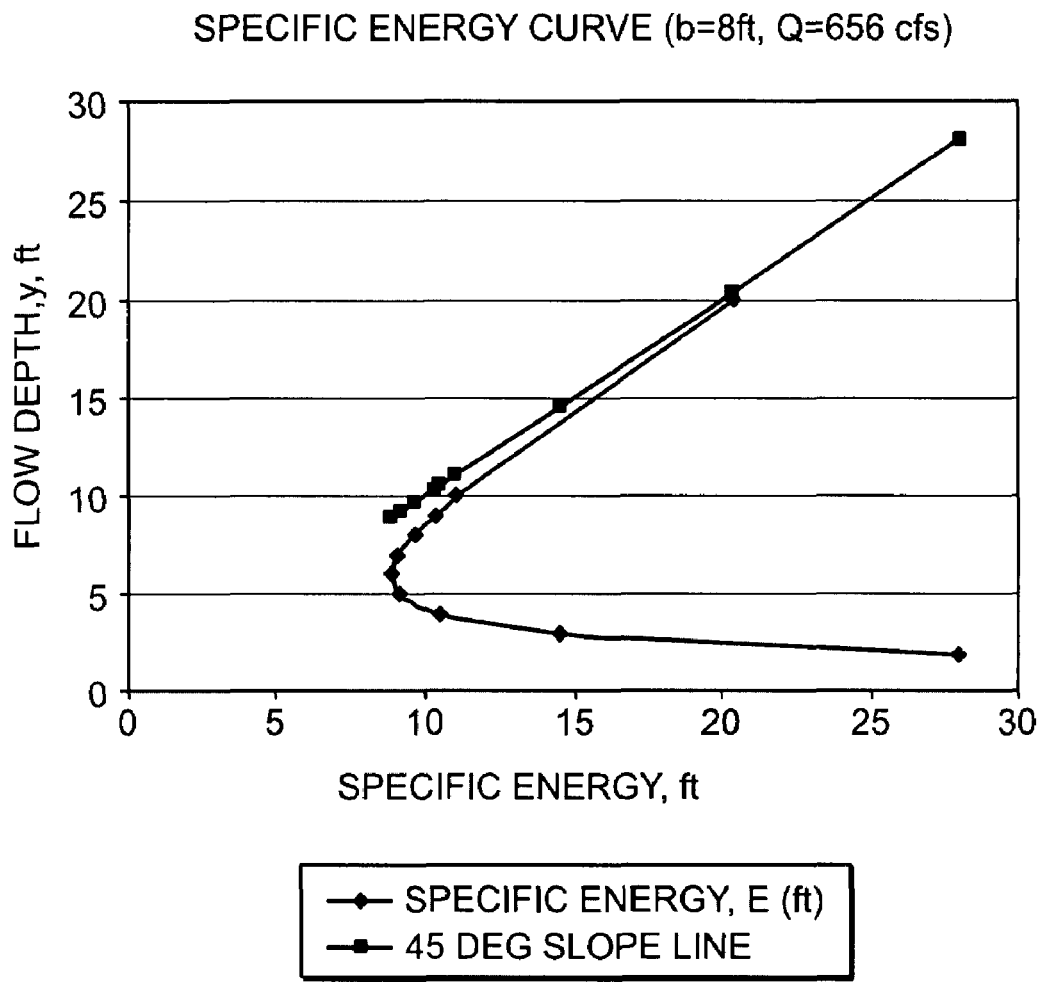
FIG. 1 is a graph showing a specific energy curve that correlates specific energy versus flow depth.

In open channel water conveyance systems, gravity is the driving force that moves the water while frictional forces along the wetted perimeter of the channel oppose the motion. A slight downward slope (generally less than 10 degrees) is sufficient to overcome the opposing frictional forces. The bottom or sides of a flow channel may be either unlined or lined with a suitable material, and when lined flow retarding frictional forces are reduced. The overall flow velocity in these types of open channels is usually designed to be relatively small to prevent turbulent flow conditions in the channel or to prevent scouring along the wetted perimeter of the channel. Ambient flow velocities in open fluid flow channels are generally less than 5 feet per second.

Consequently, since the amount of available power from a flowing stream is proportional to the cube of velocity, at such low velocities power generation from older power generation technologies was not cost-effective. I have found that this problem may be addressed by increasing the flow velocity by modifying the channel cross-section at a designated location along the length of the channel where a novel kinetic hydropower system is to be deployed. Any such modification to the channel section must not adversely affect the basic function of the channel, i.e., to convey water for drinking or irrigation purposes, and this invention produces power from otherwise slow moving fluid flows and without any undesirable effects on the primary purpose of the flow channel.

A contraction in a channel's cross-section generally referred to as a throat, will result in an increase in the flow velocity through the throat. This phenomenon is analogous to the Venturi effect in pipe flow, notwithstanding significant differences between pipe flow and open channel flow-pipe flow is driven by pressure whereas the open channel flow is caused by gravity.

Ambient flow velocities in open channels are generally in the sub-critical range. Since the power output from slow moving waters is usually too small to be cost-effective flow velocities must be accelerated in the waterways beyond a lower threshold limit at those locations along the waterway where the kinetic hydropower systems are to be installed.

For open channels with small slopes, uniform or gradually varied flows, and negligible energy losses, the flow hydraulics is governed by the Bernoulli equation which expresses conservation of energy along the length of the stream:

$$Y_1 + V_1^2/2g = Y_2 + V_2^2/2g \quad (1)$$

Where Y is depth of flow, V is the flow velocity, g is the acceleration due to gravity, and subscripts 1 and 2 refer to section 1 (upstream) and section 2 (downstream or, in this case, at the throat).

By definition, the specific energy E of an open channel flow relative to the bottom of the channel is the sum of the two terms on either side of the Bernoulli Equation 1 above:

$$E = Y + V^2/2g \quad (2)$$

A plot of Equation 2, generally called the specific energy curve, is shown in FIG. 1, with the flow depth Y along the vertical axis and specific energy, E, along the horizontal axis.

As shown in FIG. 1, for a given value of specific energy, there are two possible flow depths in a channel. At higher or deeper depth, the velocity is smaller (sub-critical value) and at the lower value of depth, the flow velocity is higher (super-critical value). The transition from sub-critical to super-critical velocity happens at the smallest value of specific energy.

In open channels that are primarily used for water conveyance purposes, the velocities are generally in the sub-critical range. In other words, the larger value of the two possible flow depths for a given value of specific energy is applicable and the flow velocity is relatively small. As the channel cross-section narrows, the flow depth decreases while the flow velocity increases. At the critical depth, the flow velocity changes from sub-critical to super-critical.

For a constant discharge Q, Equation 2 may be rewritten as follows:

$$E = Y + Q^2/2gA^2 \quad (3)$$

where A is the cross-sectional area of the channel. For a rectangular channel with a width b, Equation 3 becomes $$Y^3 - 2E g b^2 Y^2 + Q^2 = 0 \quad (4)$$

Equation 4 may be used to calculate the flow velocities along a channel with a gradually varying width. For illustrative purposes, Table 1 summarizes these calculations of flow velocities and other relevant parameters in a channel with a gradual contraction in channel width from 20 feet to 6.55 feet and at a constant discharge Q value of 656 cfs. The critical velocity, 14.77 fps, is achieved at a channel width of 6.55 ft. Thus, the channel contraction to a throat about one-third the original width increases the flow velocity to about 4.5 times the original velocity. A throat width of less than 6.55 ft will lead to a super-critical flow velocity.

TABLE 1

Venturi Effect Vs. Channel Width
(Discharge Q = 656 cfs, Small Slope, Negligible Energy Losses)

| Channel Width b[1], ft | Depth of Flow, Y, ft | Flow Velocity, V, fps | $V/V_{20}$, Velocity Multiplier[2] | Froude Number | Flow State |
|---|---|---|---|---|---|
| 20 | 10 | 3.28 | 1.00 | 0.183 | Sub-critical |
| 16 | 9.90 | 4.14 | 1.26 | 0.232 | Sub-critical |
| 14 | 9.80 | 4.78 | 11.45 | 0.269 | Sub-critical |
| 12 | 9.70 | 5.60 | 1.72 | 0.317 | Sub-critical |
| 10 | 9.44 | 6.95 | 2.11 | 0.399 | Sub-critical |
| 8 | 8.80 | 9.32 | 2.84 | 0.554 | Sub-critical |
| 7 | 8.00 | 11.71 | 3.57 | 0.730 | Sub-critical |
| 6.55 | 6.78 | 14.77 | 4.50 | 1.00 | Critical |

[1]$V_{20}$ is the flow velocity at b = 20 feet
[1]For trapezoidal channels, b represents the average channel width, i.e., b = $(b_1 + b_2)$ where $b_1$ is the channel width at the top (water line) and $b_2$ is the channel width at the base.
[2]$V_{20}$ is the flow velocity at b = 20 feet.

Figure 2:
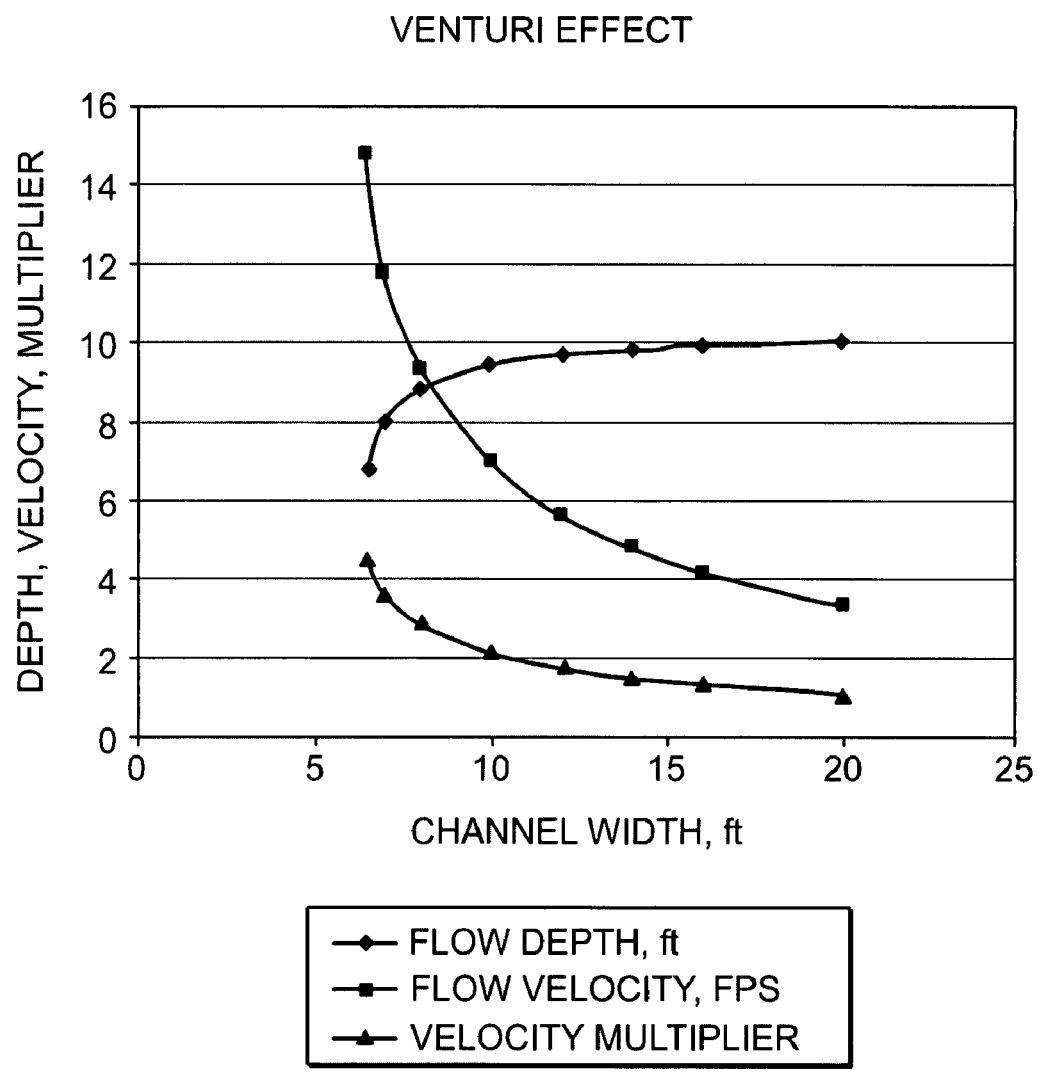
FIG. 2 is a graph showing the Venturi effects correlated to channel width and depth.

A graphical representation of the variations in flow depth and flow velocity with decreasing throat widths is shown in FIG. 2.

Table 1 also shows the values of the Froude Number, F, defined below, for various flow velocities.

$$F = V/(gD)^{1/2} \quad (5)$$

Figure 3:
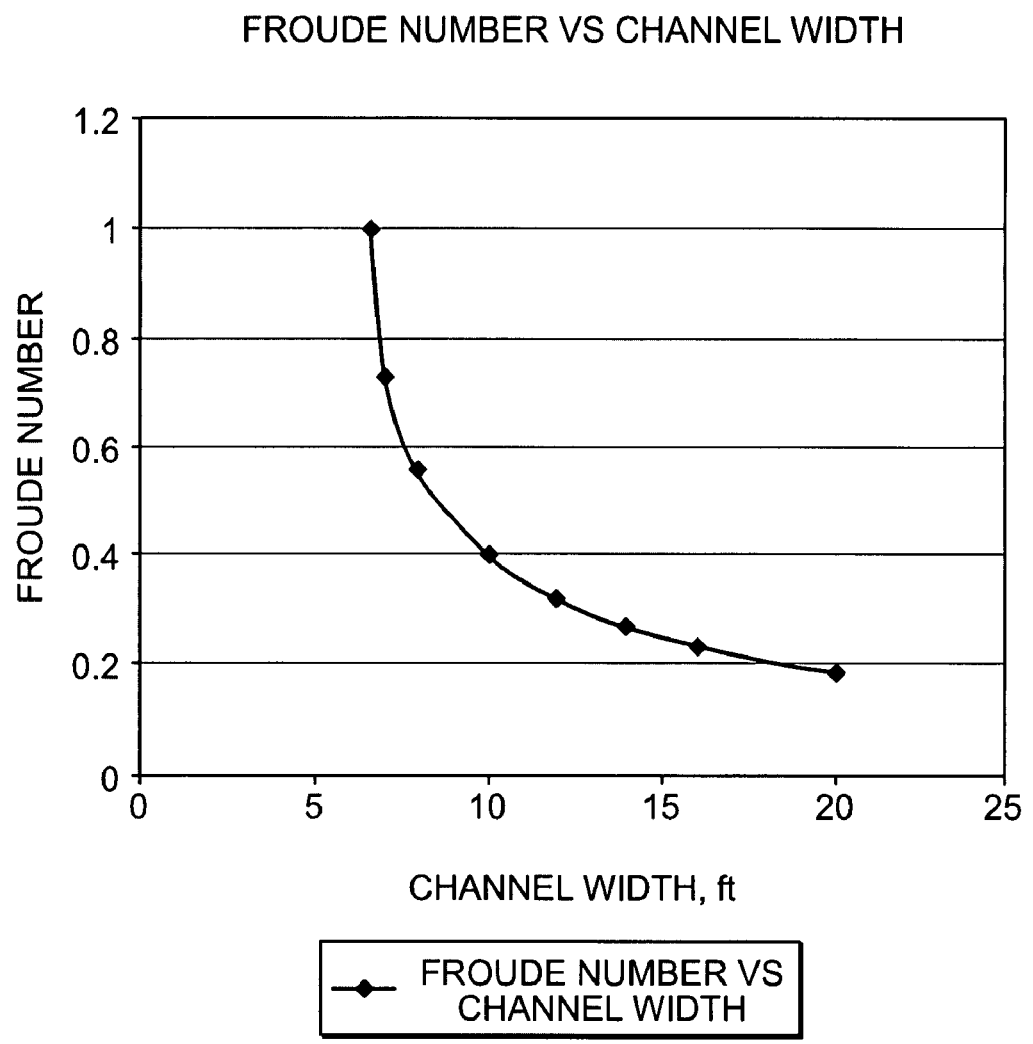
FIG. 3 is a graph correlating Froude numbers with flow channel width.

In Equation 5, D is the hydraulic depth, and for a rectangular channel D will be equal to the flow depth Y. For a trapezoidal channel, D is defined as $(b+zY)Y/(b+2zY)$ where b is the channel width at the base and z is the inverse of the slope of the side of the channel. The Froude Number is less than 1 for sub-critical flows, greater than 1 for super-critical flows, and equal to 1 at the critical flow velocity. The variation of Froude Number with the throat width is shown in FIG. 3.

Where the flow depth Y is used, it can be shown that the denominator in Equation 5 for the Froude Number is the celerity of an elementary gravity wave in shallow water:

$$c = (gY)^{1/2} \quad (6)$$

Then, Equation 5 can be rewritten as $$F = V/c \quad (7)$$

With the Froude Number now defined as in Equation 7, the following observations can be made:

1. Where F<1, the flow in a particular channel is sub-critical. Gravitational forces will be dominant over the inertial forces, and the velocity of flow is less than the celerity of an elementary gravity wave. Thus, such a wave can propagate upstream against the flow. As a result, the upstream areas are affected by what happens in the downstream areas, and narrowing of the channel width downstream may affect the flow depth upstream.
2. Where F>1, the flow is super-critical. Now, inertial forces are dominant over the gravitational forces, and the velocity of flow is greater than the celerity of an elementary gravity wave. Therefore, such a wave cannot propagate upstream against the flow, and the upstream areas are not affected by what happens in the downstream areas. In this case a narrowing of the channel width downstream will not affect the flow depth upstream.

Figure 4:
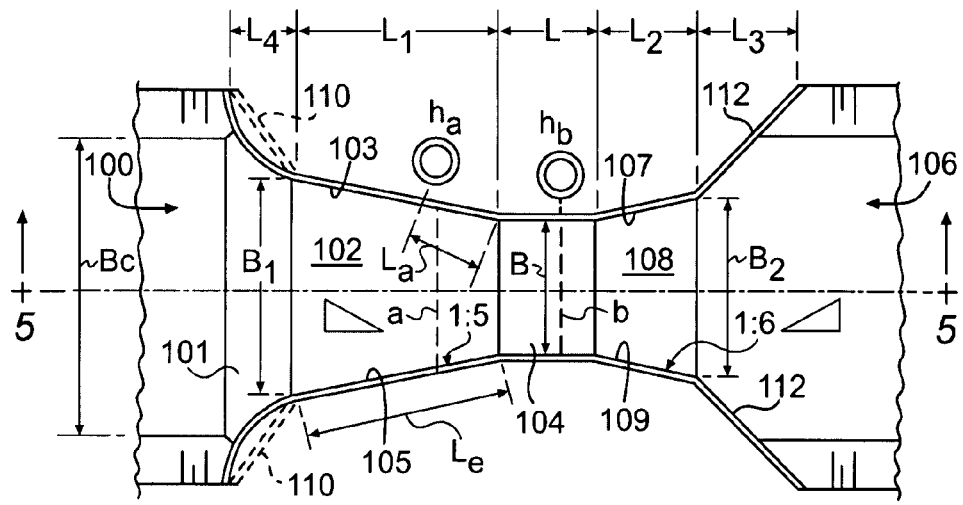
FIG. 4 is a top plan view of a prior art Parshall Flume.
Figure 5:
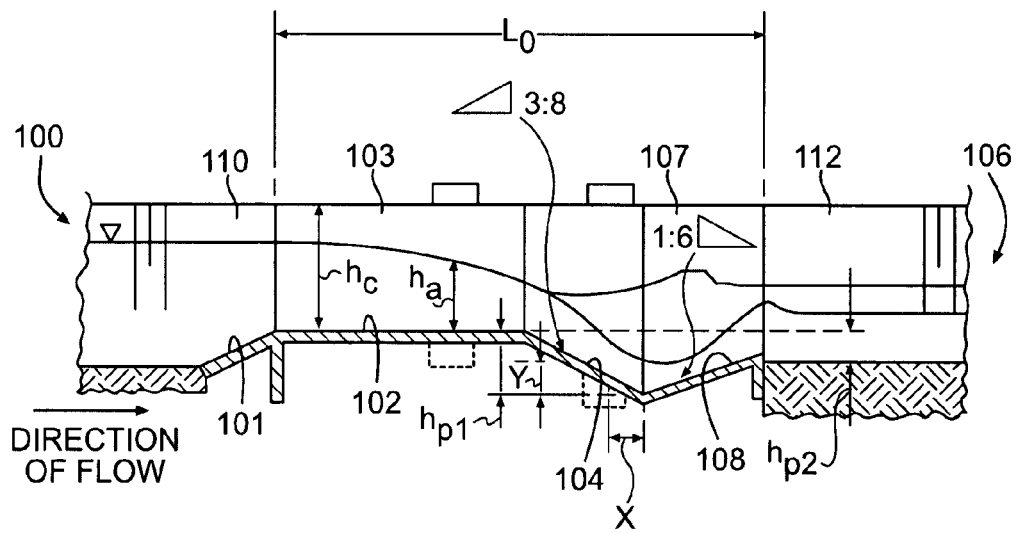
FIG. 5 is a cross-sectional view of the flume of FIG. 4 taken along line 5-5.

Since the 1920's, various types of flumes have been used in open channels throughout the world. The primary function of these flumes was not to achieve any acceleration of flows in the channel, but to measure the flow of fluids in open channels. The most widely used among these is the Parshall Flume, and example of which is shown in FIGS. 4 and 5. It can be noted as well that ASTM Standard D 1941 and International Standard ISO 9826 contain detailed specifications for the open channel flow measurement of water with the Parshall Flume.

According to ISO 9826, the Parshall Flume, as shown in FIGS. 4 and 5, has a converging entrance section 100 followed by a level floor 102 whose side walls 103 and 105 continue to converge, as shown in FIG. 4, after which a short throat section 104 is defined by a floor that is inclined downward at a gradient of about 3:8, which is followed immediately by an upwardly floor 108, inclined upwardly at a gradient of 1:6, that opens into a diverging exit 106.

Parshall Flumes have a generally rectangular cross-section and a wide range of throat widths varying from very small (1 inch) to large (50 feet and greater). Large Parshall Flumes with throat widths between 10 feet and 50 feet are suitable for measuring discharges in the range of 25 cfs to 3,300 cfs.

velocities in the fluid flow channels to a level that permits the cost effective generation of kinetic hydropower from slow moving water flows.

As an exemplary embodiment of the present invention, the design of the present invention can assume a canal width of about 20 ft, a discharge rate of 360 cfs, an upstream flow depth of 6.0 ft, and a flow velocity upstream of the flume calculated to be about 3.0 fps. ASTM Standard D 1941, a Parshall Flume with a central throat width, B, of about 12 ft has an upstream width, $B_1$, of about 18.40 ft. The width of the diverging flume section, $B_2$, following the throat is 14.67 ft at the exit section. The axial lengths of the various sections of the flume include a converging section, $l_1$=16.0 ft; a throat section, 1=3.0 ft; and a diverging section, $l_2$=8.0 ft.

Figure 6:
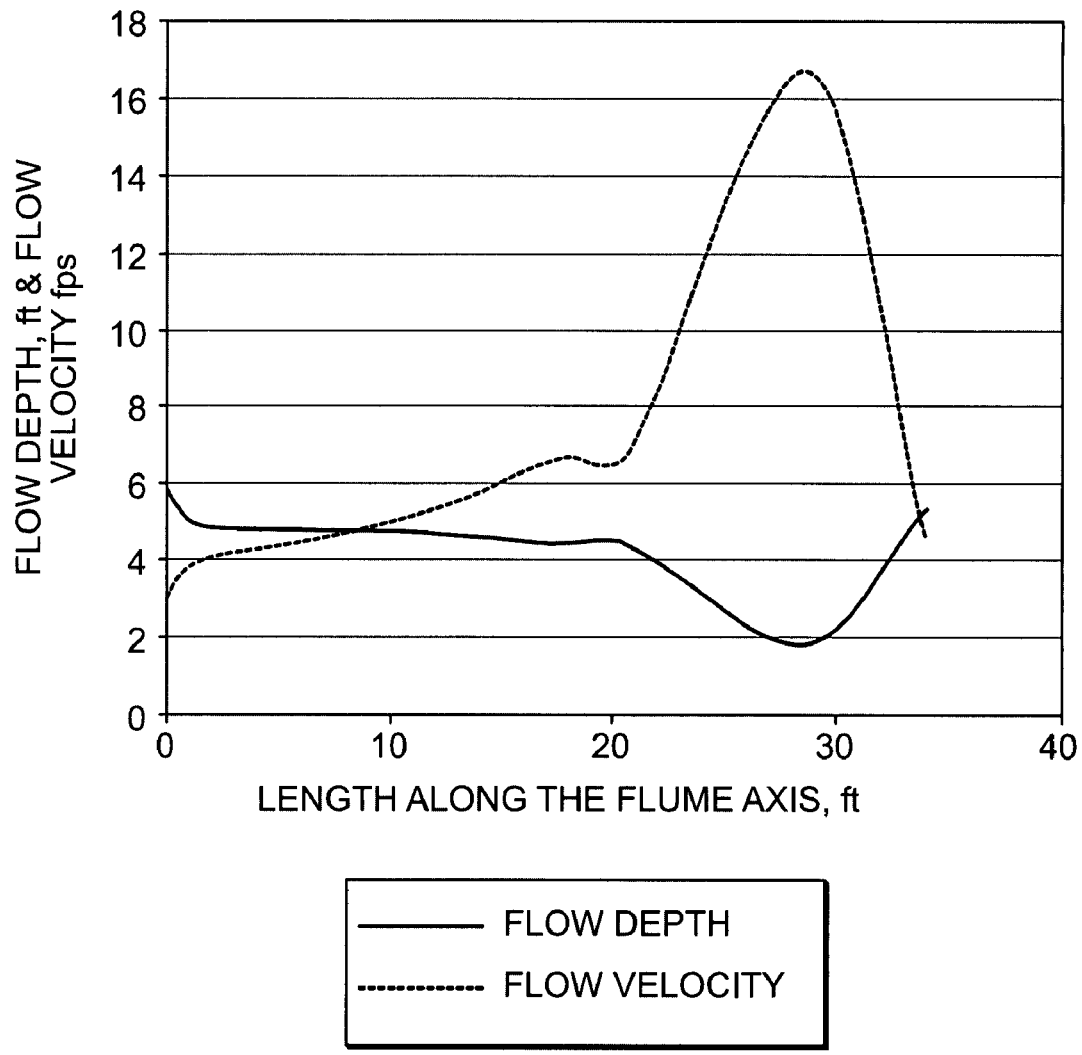
FIG. 6 is a graph correlating the depth and flow velocities of an Exemplary Embodiment Flume.

The flow depths, velocities, and other parameters for this flume are tabulated in Table 2, and the flow depths and flow velocities for this flume are plotted in FIG. 6.

TABLE 2

Exemplary Embodiment Flume with Throat Width of 12 ft
(Discharge Q = 360 cfs, Small Slope, Negligible Energy Losses)

| Channel/Flume Width b, ft | Length Along Flume Axis, ft | Depth of Flow, Y, ft | Flow Velocity, V, fps | $V/V_{20}$, Velocity Multiplier[1] | Froude Number | Flow State |
|---|---|---|---|---|---|---|
| 20 | 0 | 6.0 | 3.00 | 1.00 | 0.22 | Sub-critical |
| 18.4 | 1.6 | 4.9 | 3.99 | 1.33 | 0.32 | Sub-critical |
| 15.2 | 9.6 | 4.8 | 4.93 | 1.64 | 0.40 | Sub-critical |
| 12.0 | 17.6 | 4.5 | 6.66 | 2.22 | 0.56 | Sub-critical |
| 12.0 | 19.1 | 4.4 | 6.82 | 2.27 | 0.57 | Sub-critical |
| 12.0 | 19.8 | 3.0 | 13.5 | 4.5 | 1.38 | Super-critical |
| 12.0 | 20.2 | 2.4 | 15.0 | 5.0 | 1.72 | Super-critical |
| 12.0 | 20.6 | 1.8 | 16.66 | 5.55 | 2.19 | Super-critical |
| 14.67 | 28.6 | 5.3 | 4.6 | 1.54 | 0.35 | Sub-critical |

[1] $V_{20}$ is the flow velocity at b = 20 feet

One of the most desirable features of Parshall Flumes is that they operate satisfactorily at high submergence ratios with low head loss. This is especially attractive for flow measurements in channels with small bed slopes. The flume is self-cleaning for moderate solid transport.

Parshall Flumes are empirical devices. The dimensions and other design details as specified in ASTM Standard D 1941 and ISO 9826 must be maintained within 2% because corrections for non-standard geometry are only estimates.

Parshall Flumes may be constructed from a variety of materials including concrete, wood, metal, or plastics. The inside surface of the flume should be at least as smooth as a good quality concrete finish. The structure should also be rigid and watertight, capable of withstanding flood-flow conditions without damage from outflanking or from downstream erosion, and the axis should be in line with the direction of flow in the upstream channel.

To ensure a smooth entry of flow into a Parshall flume and to minimize surface disturbance at the exit of the flume, the entrance and exit cross-sections should be connected to the channel side slopes by means of vertical wing walls such as walls 110 and 112 in FIGS. 4 and 5, respectively, disposed at 45 degrees to the flume axis.

One feature of the Parshall Flume is that it does not impact the flows upstream if the recommended design and dimensions are maintained within 1-2% of the specifications in ASTM D 1941 or ISO 9826 where the flume is operated under free-flow conditions. Therefore, the Parshall Flume provided a starting point for the development of the present invention and the development of a flume design that produces flow acceleration in open channels to a sufficient extent that cost effective power generation can be accomplished. The present invention achieves its primary objective of accelerating flow According to ASTM D 1941, for Parshall Flumes with throats in the 10-50 ft range, the flow becomes submerged if the ratio of $h_a$ to $h_b$ is greater than 0.8, where $h_b$ and $h_a$ are the flow depths at gauge points b and a respectively (FIG. 4). For this Exemplary Flume, the above ratio is 0.4; there is no submergence and the flume is operating under free-flow conditions. In ASTM D 1941, free-flow values should be used to design this flume.

The relationship between flow depth and flow velocity in the Exemplary Flume is clearly shown in FIG. 5, where the flow depths decrease at higher velocities resulting from a converging flume section. The dip of floor 104 in the throat of the Exemplary Flume further accelerates the flow into the supercritical stage where the Froude Number F reaches a value of 2.19 at the end of the throat (at the end of floor 104). Beyond this point, side walls 107 and 109 of the flume diverge outwardly and floor 108 is inclined upwardly. Thus, by the end of the diverging section, the flow velocity has dropped off to the sub-critical stage and the Froude Number is less than 1. Consequently, using the Exemplary Flume with the 12 ft throat permits the flow velocity to be accelerated from the ambient 3 fps to 6.67 fps at the starting point of the throat and to 16.66 fps at the tail end dip of the throat. Of course, the increase in the velocity is at the expense of the flow depth which decreases from 6 ft to 1.8 ft corresponding to above values of the velocity.

Velocity Increasing Flume

Figure 7:
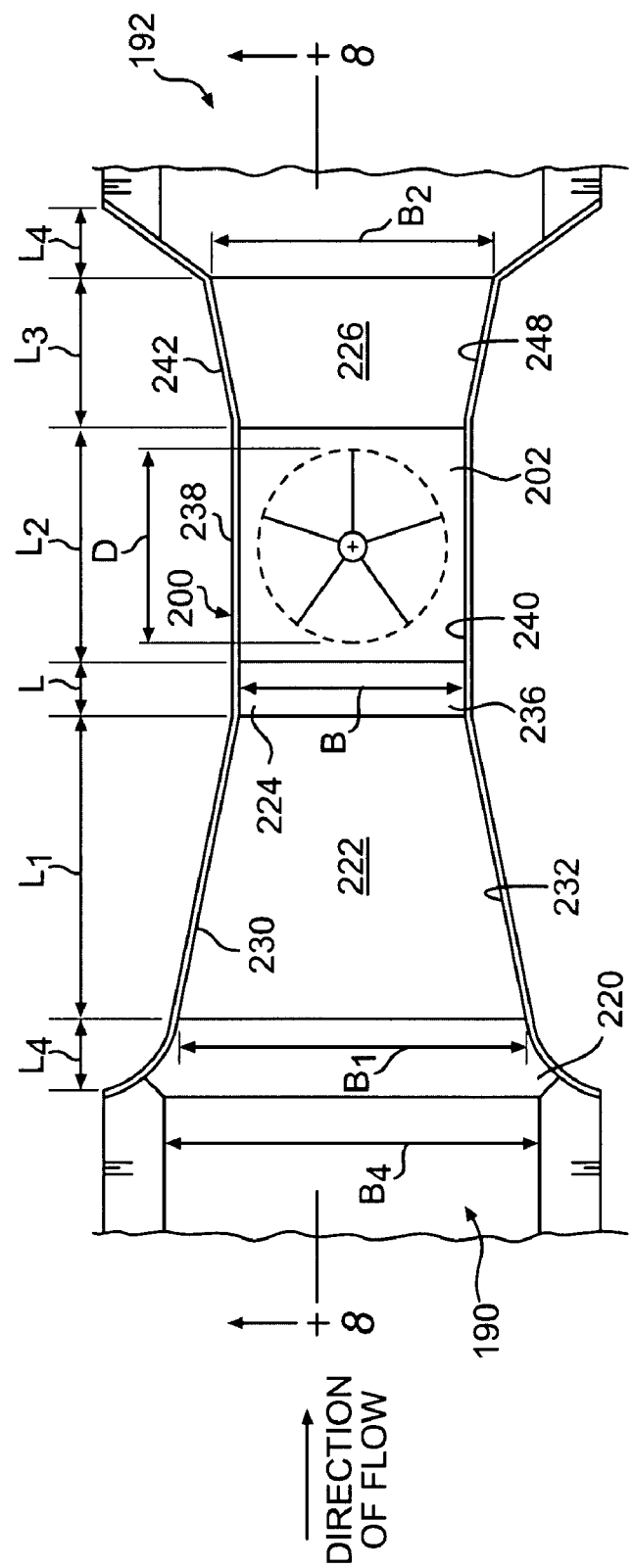
FIG. 7 is a top plan view of a flume according to the present invention.
Figure 8:
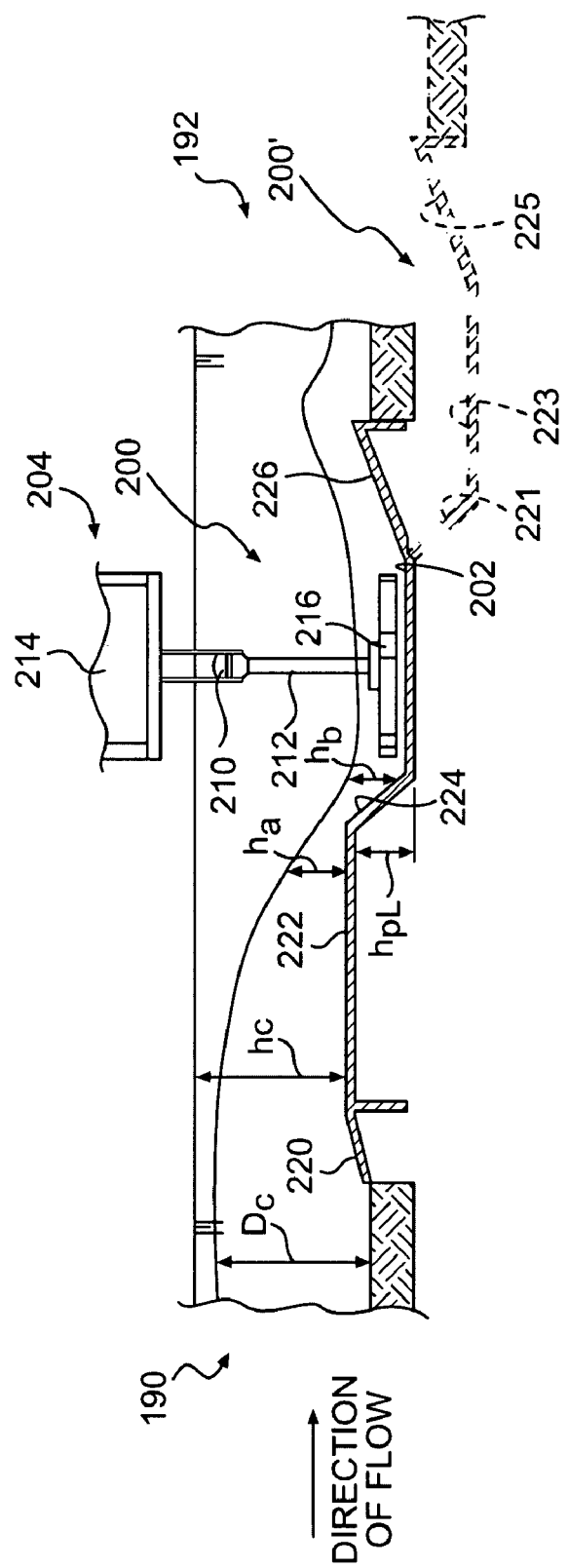
FIG. 8 is a cross-sectional view taken along line 8-8 of the flume of FIG. 7.

An exemplary embodiment of the construction details a flume according to the present invention is shown in FIGS. 7 and 8.

In the plan view of FIG. 7, the flow direction from left to right is labeled and shown by an arrow at the left end of the figure. Flow begins at an entrance end 190 and concludes at an opposing exit end 192. Various length designations are indicated for the several sections that make up the flume and are noted along the top-most line in the figure. They are L, $L_1$, $L_2$, $L_3$, and $L_4$, respectively. The widths of the flume are shown by the "B" designations and include $B_c$, $B_1$, B, $B_2$ and $B_3$. (B3 at the diverging end is not marked in FIG. 7) In the bottom cross-sectional view, FIG. 8, several heights are noted as well and these are designated by $D_c$, $H_c$, and $H_{p1}$ with $D_c$ indicating fluid or water depth adjacent the entrance end 190. $H_c$ is the height of sidewalls 230/232 and $H_{p1}$ is the depth of the acceleration zone 200 below floor 222, or the dip of the throat, and $h_{p2}$ is the dip the exit 106. One additional dimension is noted within section L.sub.2 as dimension "D" which refers to the diameter of the turbine blades 216 of a power generator 204 which is discussed hereafter.

With reference to the cross-sectional view of FIG. 8, there are a number of angled bottom or floor structures that together with side walls make up the flume. The entrance end 190 begins with section $B_1$ where the slope of the upwardly sloping floor member 220 can range from 0° to about 20°. The downward slope in section B of floor member 224 ranges from about 15° to about 30°, and the upward slope in section $B_2$ of floor member 226 ranges from about 5° to about 20°. As discussed more below, the downward slope of floor 224 will be greater than the upward slope of floor 226. Accordingly, it should be understood that there is a relationship between the slope of the floors 224 and 226. In addition, both rectangular and trapezoidal flume and channel designs are contemplated as being within the scope of the present invention and the present invention will work in each of these channel types. The structure of the present invention assures that there will be a positive acceleration of the fluid, such as, for example, water, as it moves through the flume, and that the flow rate will be accelerated to speeds where power generation is very efficient.

As was noted above, the flume also includes sidewalls that effect and help control fluid flow through the flume. Sidewalls 230 and 232, best shown in FIG. 7, begin adjacent section $B_1$ at the entrance end 190 and extend to section B. Walls 230 and 232 can begin with a curved inlet end and then converge toward one another as they approach section B. They can converge, for example, at an angle ranging from about 5° to about 20° relative to the central axis A. There is a relatively flat floor 222 positioned between at least a portion of walls 230 and 232, and between floors 220 and 224, in section $L_1$.

The flume design according to the present invention has a modified central portion where the flume's flow path has been redesigned to include an acceleration zone 200, which can be, for example, in the form of a flat, generally square, horizontal floor section or platform 202 at the end of the throat delineated by the dip created by angled floor 224 and following the angled side walls 230 and 232. The upwardly angled floor section 226 is provided at the end of floor or platform 202 and opens into and forms a part of the exit 192 of the flume.

Figure 9:
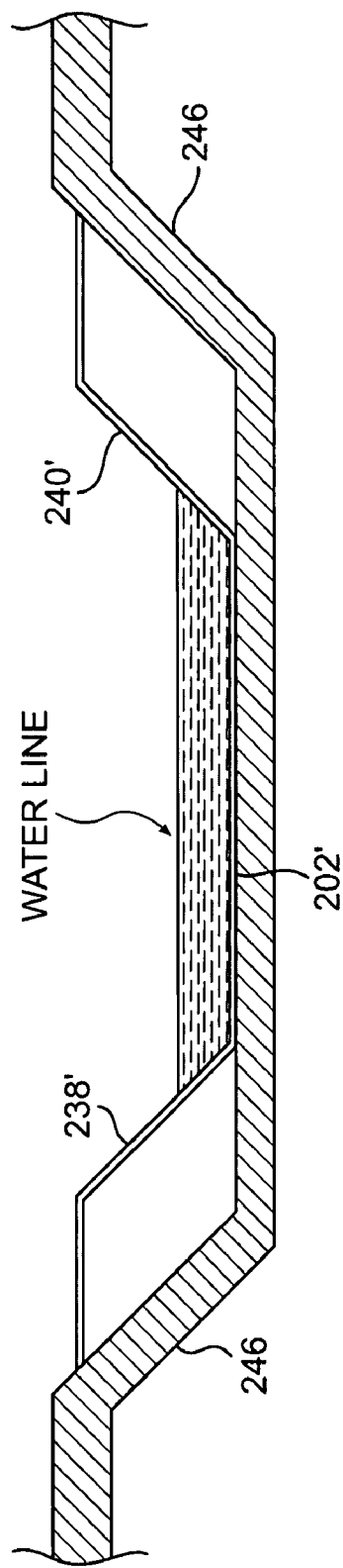
FIG. 9 is a diagrammatic view of a trapezoidal flow channel and flume.

The acceleration zone 200 can be a part of a rectangular channel structure, or alternatively it can be a part of a trapezoidal channel structure. Where the channel structure exhibits a rectangular section, the flow channel and the acceleration zone 200 will be comprised of a base and two vertical sides that are positioned at about a 90° angle relative to the base. Where the channel structure exhibits a trapezoidal section the flow channel and the acceleration zone 200 will be comprised of a base and two sloping or angled sides that can slope at a range of angles relative to the base, and will preferably vary from about 45° to about 90°. FIG. 9 shows such a trapezoidal channel section or structure where the sides of the channel 246 are angled outwardly away from the vertical and the flume's side walls 238' and 240' are positioned at a corresponding angle adjacent the flat floor 202'. The fluid or water flow is shown as being across the floor 202' and between the sidewalls 238' and 240'.

Consequently, the present invention is not limited to any particular channel size, channel shape or channel structure. What is important is that the fluid flow rate be increased along a portion of the flume to allow a power generating system to be employed within the accelerated flow to generate power.

The acceleration zone 200 is defined by a substantially flat or horizontal floor 202 positioned between floors 224 and 226. In addition, the acceleration zone 200 is bounded by side walls 238 and 240. The downwardly sloped floor 224 is also bounded by side walls 234 and 236 while the upwardly sloped floor 226 is bounded by side walls 242 and 244. Side walls 234 and 236 are also substantially parallel with the axis A while side walls 242 and 244 diverge at an angle ranging from 5° to 30° and terminate at the exit end 192.

Angled floors 224 and 226 are not of the same length, angle or size of floors 104 and 108 in FIGS. 4 and 5 that are used in a Parshall Flume. Rather, floors 224 and 226 are designed, along with floor 202, to achieve a desired flow acceleration of the fluid moving there through, and to achieve a velocity multiplier in the acceleration zone 200 of from about 3 to about 10 times the speed of the ambient upstream flow velocity. This flow acceleration can be determined from a hydraulic analysis and design that is embodied in Equations (1) through (7) above and that, for example, formed the basis of the information contained in Table 2 above.

It is preferred to maintain the flow velocity within and across the acceleration zone 200 in the supercritical range in order to make the production of power by the most efficient, but having the velocity above supercritical is not critical to the production of power. Rather, as the velocity drops below supercritical flow conditions the amount to power and efficiencies of generating power will lessen proportionately.

The increase of flow velocity in the level platform is achieved and sustained by the acceleration zone starting with the slope of floor 224 and its intersection with floor 202. The flow acceleration is caused by both the drop in elevation of floor 224 and by the narrowing of the flow section defined by side walls 230 and 232. The acceleration is sufficient to allow for a slowing of the flow occasioned by having had some of the kinetic energy extracted by the turbine blades 216 and by the up ward angle of floor 226, but the Froude Number will be kept in a range that will not cause an upstream backup.

The slope difference between floor 224, which is preferably ranging from 15° to 30°, and floor 226, whose slope ranges from about 5° to about 20°, will maintain flow velocities within sufficient ranges, with the slope of floor 224 preferably being about 10° greater than the slope of floor 226.

The acceleration zone 200 can be comprised of a horizontal floor section 202 that can have a variety of sizes that can range, for example, from about 4×4 to about 50×50, depending upon the overall dimensions of the flume design that will best fit into the fluid channel where the flume is to be used or installed. A more preferred range would be a horizontal platform 202 that is dimensioned from about 6 ft. by 6 ft. to about 12 ft.×12 ft. In practical terms, a 12 ft×12 ft section will fit or be most useful in a channel having a width of about 20 ft. A smaller acceleration zone, for example a 7.5 ft×7.5 ft area, would be most useful with a channel having a width of about 12 ft to 15 ft. The size of an appropriate acceleration zone for channel sizes in-between those mentioned above, as well as for larger or smaller channel sizes, would be proportionally larger or smaller relative to the above ranges. For these flume dimensions, the power may be in the range of about 0.5 KW to about 500 KW.

In a preferred embodiment, the dimensions for $L_2$ and b will be the same, but variations can occur. As noted above, for channel widths that range from about 12 ft to 20 ft, the preferred dimension for the acceleration zone, as shown by $L_2$, range from about 7.5 ft to about 12 ft.

Figure 10:
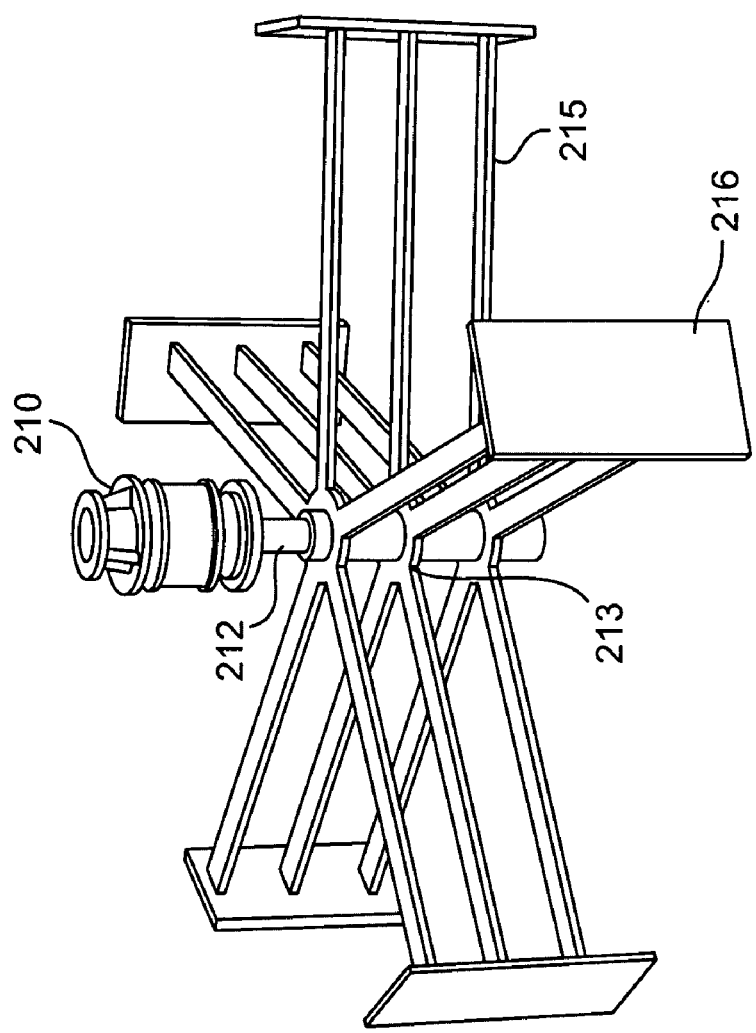
FIG. 10 is a perspective view of a turbine for use with the power generation system of the present invention.
Figure 11:
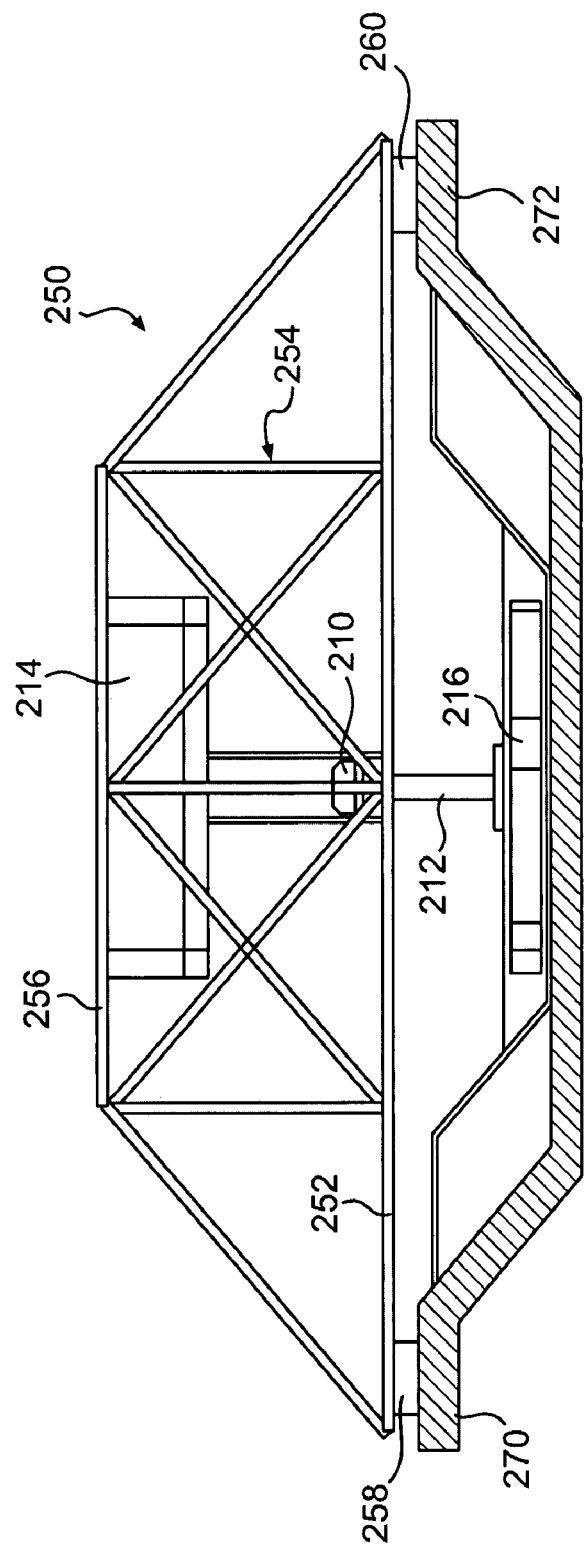
FIG. 11 is a diagrammatic cross sectional view of a flume and the power generation system support structure.

FIGS. 7 and 8 also show the power generation assembly 204 as including a set of turbine blades 216 that are connected by a rotor shaft 212 to a gear box/generator 210. Turbine blades 216 can have a relatively small or flat vertical orientation and are positioned in the acceleration zone 200 as defined by the horizontal section "$L_2$." Further, vertically oriented turbine blades could be like these shown in FIG. 10 where the blades 216 are connected to a central hub 213 by horizontal struts 215. Hub 213 itself slidingly fits over and is connected to rotor shaft 212 of the gear box/power generator 210 to form an integral rotor structure. The power generation assembly 204 can be supported, for example, by an overhead turbine support structure or mount 214, which, as is shown in FIG. 11, is in turn attached to a cross-beam and truss assembly generally indicated at 250. The cross-beam and truss assembly 250 can be comprised of a series of bottom cross beams 252, a truss section 254 and a top beam 256. Support blocks 258 and 260 are used to mount the whole assembly 250 on each of the respective sides 270 and 272 of the channel structure. This type of support structure can be used to provide the needed support and stability for the entire power generation assembly 204. The overhead turbine support structure 214 could also be mounted in a cantilevered manner to one of the sidewalls of the flume. What is required is that there be a stable mount that will support the power generation assembly 204 so that it will be supported over and positioned in the acceleration zone 200.

It should also be understood that a second acceleration zone, for example a terraced acceleration zone, such as, for example, is shown in phantom in FIG. 8. Such a second acceleration zone, as shown at 200', is defined by a substantially flat or horizontal floor 223 located between sloping floor sections 221 and 225. Such a second acceleration zone 200' could be used where it might be desirable to further enhance the amount of acceleration, or where flows might be desirably sustained over a wider range. In this situation, a second power generation unit could be used in the second acceleration zone 200'.

The dimensions of flumes according to the present invention, and other important dimensions and flow capacities are set forth in the following Table 3. As was noted previously, and as is demonstrated, the various dimensions and sizes of flumes can vary. Likewise, it should be understood that the dimensions of the present flume can be varied to fit particular site conditions (for example, channel width, cross-section, flow depth, and ambient flow velocity, as well as other such factors).

TABLE 3

Standard Dimensions & Capacities[3]

| Widths[4] ft | | | Axial Lengths ft | | | | Wall Depth ft | | Vertical Distances | | |
|---|---|---|---|---|---|---|---|---|---|---|---|
| | Upstream | Div. | Conv. | | Power | Div. | Conv | UpStream | Below Crest ft | | Flow |
| Throat B | End $B_1$ | Sect. $B_2$ | Sect. $L_1$ | Throat L | Platform $L_2$ | Sect. $L_3$ | Sect. $H_c$ | Flow Depth $D_c$ | Dip at Throat $H_{p1}$ | End of Div. Sect. | Capacity ft$^3$/sec |
| 12 | 18.4 | 14.67 | 16.0 | 3.0 | 12.0 | 8.0 | 5.0 | 6.0 | 1.12 | 0.5 | 520 |
| 20 | 30.0 | 24.0 | 25.0 | 6.0 | 20.0 | 12.0 | 7.0 | 8.0 | 2.25 | 1.0 | 1340 |
| 30 | 40.0 | 34.7 | 26.0 | 6.0 | 30.0 | 14.0 | 7.0 | 8.0 | 2.25 | 1.0 | 1990 |
| 40 | 50.8 | 45.3 | 27.0 | 6.0 | 40.0 | 16.0 | 7.0 | 8.0 | 2.25 | 1.0 | 2640 |
| 50 | 60.8 | 56.7 | 27.0 | 6.0 | 50.0 | 20.0 | 7.0 | 8.0 | 2.25 | 1.0 | 3280 |
| 4.0 | 6.4 | 5.0 | 5.9 | 2.0 | 4.0 | 3.0 | 3.0 | 3.5 | 0.75 | 0.25 | 68 |
| 8.0 | 11.2 | 9.1 | 7.9 | 2.0 | 8.0 | 3.0 | 3.0 | 4.0 | 0.75 | 0.25 | 140 |

[3]Deviations from the standard dimensions are permissible subject to following restrictions: Slope angle in the converging section (plan View) is in the range 5-20 deg; downward slope in the throat dip (sectional view) is in the range 15-30 deg; and upward slope in the exit diverging section (sectional view) is in the range 5-20 deg.
[4]For use in trapezoidal channels, the width shown in the table represents the average AV Flume width, i.e., one-half the sum of the flume widths at the top (water line) and at the base.

The available power from a flowing stream can be determined form the following equation:

$$P = \tfrac{1}{2}\rho\eta AV^3, \quad (8)$$

where $\rho$=water density, $\eta$=efficiency of the system, A=cross-sectional area of the water in the channel, and V=flow velocity.

While the potential range of power that might be generated by use the present invention can be in the range of about 0.5 KW to about 500 KW, where the acceleration zone is formed with a 12 ft×12 ft horizontal deployment platform, the potential available power, assuming a 25% efficiency of the kinetic hydropower system is:

$$P = 38{,}711 \text{ ft-lb/sec} = 33 \text{ KW}$$

The present flow accelerating flume or device, as described herein, is primarily comprised of an acceleration zone, but can include as well a number of acceleration zones each of which may house and power a turbine/generator assembly or a number of such assemblies. Each such flume/generator assembly will enhance the amount of power generated in accordance with the power formula (8) and will provide an alternative source of electrical energy. The invention can also include a pre-acceleration zone or a plurality of pre-acceleration zones preceding a primary acceleration zone or zones, especially where the enhancement in flow velocity can be achieved through a combination of contraction in the channel cross-section, a drop in the elevation of the channel bed, or both. In addition, the present invention can also include a post-acceleration zone or a number of post-acceleration zones following the primary acceleration zone or zones where the flow is slowed down and restored to desired ambient conditions through a combination of expansion in the channel cross-section, a rise in the elevation of the channel bed or both.

While the flume design of the present invention achieves flow-acceleration for the fluid flowing through the flume that speeds up that flow to maximize power output, this acceleration of fluid will not adversely affect upstream flow conditions (e.g. flow-accelerating flumes that do not cause an increase in the upstream water depth that may lead to the canal overtopping its banks). Rather, it provides a an acceleration zone in a central portion of the flume where the flow velocities can be increased to many multiples of upstream ambient flow velocity, and where a kinetic hydropower system can be deployed to generate power. It should be understood that known flumes have a sole purpose which is the measurement of flow volumes. Parshall Flumes or any other existing flumes were never used, and cannot be used, for power generation applications.

The fabrication materials for flumes according to the present invention may involve a variety of material types including fiber-reinforced plastics, wood, stone, reinforced concrete, metals, or other similar materials or combinations thereof. The flume according to the present invention remains self-cleaning, and can be operated under free-flow or submerged-flow conditions, with the preferred mode of operation being in a free-flow mode.

The flume according to the present invention can be installed and operated at suitable points, an even multiple points, along the length of a variety of types of waterways without causing an increase in the upstream flow depth or otherwise adversely impacting the primary function of the waterway, what ever that particular purpose might be. That is primarily because the kinetic hydropower system will be deployed in the acceleration zone defined by the horizontal platform.

Figure 12:
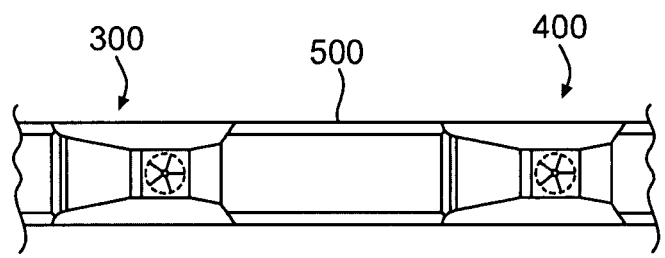
FIG. 12 is a diagrammatic top plan view showing use of multiple flumes along a flow channel.
Figure 13:
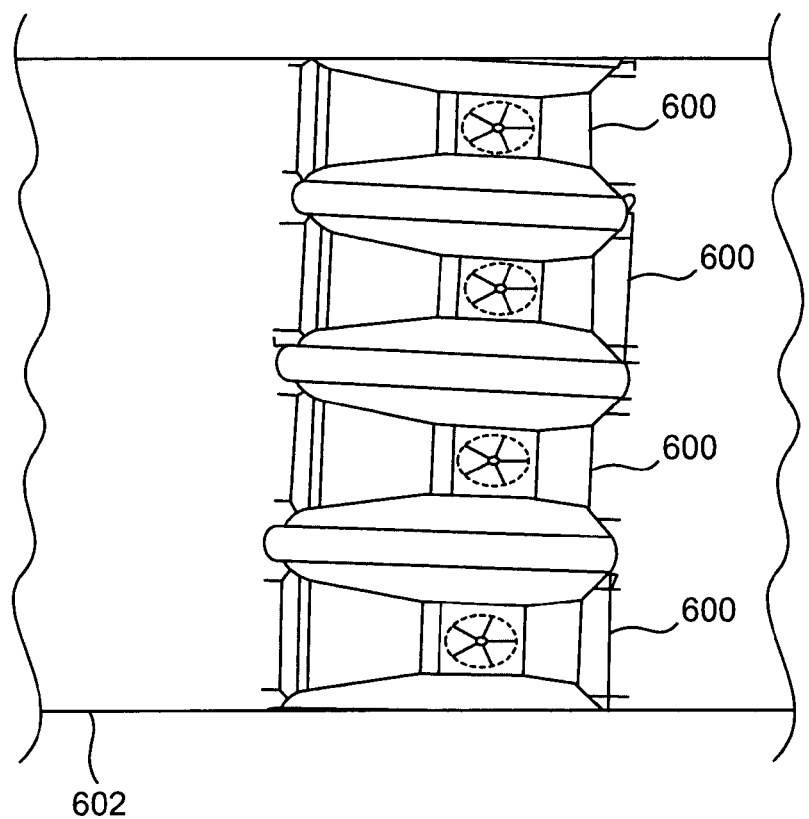
FIG. 13 is a diagrammatic top plan view of a plurality of flumes spaced out across a channel.
Figure 14:
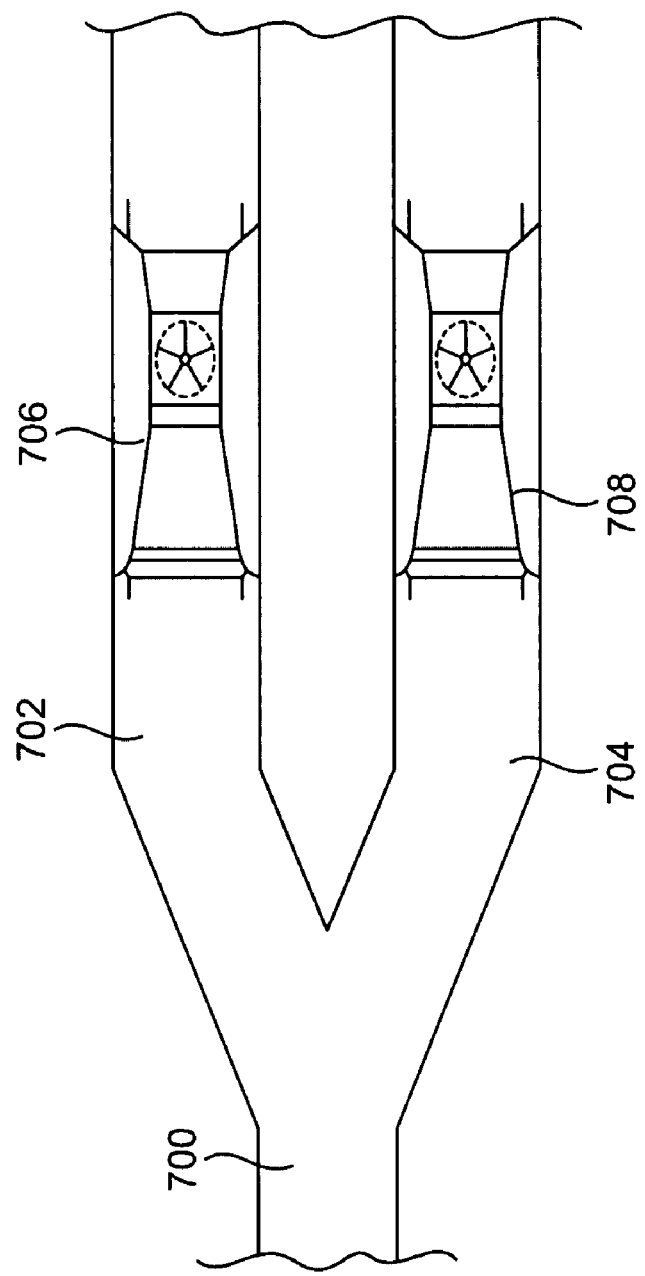
FIG. 14 shows the use of flumes in a divided flow.

Use of multiple flumes is shown in FIG. 12 where a series of flumes, 300 and 400, each formed according to the present invention, are shown as being deployed in series along the length of a flow channel 500. It should be understood that multiple flumes could also be incorporated in a parallel fashion, for example as shown in FIG. 13 where the main flow is wide and multiple flumes 600 are provided next to each other across the width of the flow channel 602. The main channel would have sufficient flow to power each flume with each producing its own supply of power. As another alternative, shown in FIG. 14, the main flow channel 700 could itself be divided into multiple, parallel flow channels 702 and 704 with a separate flume 706 and 708 provided in each resulting channel. As shown in FIG. 12, each of these alternative flume designs could also incorporate multiple flumes in series where the flow rates are sufficient to support that design. Each divided channel 702 and 704 would have its own separate flow paths, with each having suitable flow rates, and the flume or flumes incorporated into each of the separate paths would each produce power. Thereafter, the flows could be brought back together or kept separate. The lateral or longitudinal spacing between each of the flumes 300, 400, 600 or 700, or between however many flumes are used, depends on site-specific conditions including the channel cross-section and slope, existing flow parameters in the channel, the vertical drop, the amount of flow acceleration achieved in each flume, the desired flow velocity downstream of the turbine, and so on. The flume spacing may also be designed to meet the siting requirements of the potential user of the power generated. For example, in some cases, the owner/operator of the canal may be the end user of the power generated by the flume/turbine system. In these situations, the location and spacing of the flume can be adjusted to satisfy the owner's requirements for power at desired locations.

It should be understood that the present invention can be formed in flumes of any size, as well as trapezoidal flumes, rectangular flumes and even flumes having U-shaped or other cross-sectional shapes since an acceleration zone can be provided in each type of water flow.

Cross-Axis Turbine

One type of power generating device that can be used with the present invention is a Cross-Axis turbine. This turbine is a vertical-axis system as is represented by the shaft 212 in FIG. 8. This can be very useful for deployment of the turbine in the top-down configuration by affixing it to an overhead transverse support structure 214 that can span the canal width, or be supported from one side making it valuable for use in shallow water depths, such as will exist in the acceleration zone 200. This cross axis turbine will be deployed in the horizontal platform 202 in the area immediately following the dip created by floor 224. It has an added advantage that it need not be fully submerged. Only the blades 216, which are themselves very small in a vertical direction, must be below the waterline. The gear-box/generator 210 may be located above the water, avoiding the use of water-tight seals and other problems associated with the installation and operation of underwater systems. Assuming a 10-ft diameter vertical axis machine with 5 vertical blades, blade height of 1.5 ft, and a 33% efficiency, the power generated by the machine is calculated as follows: $P=\frac{1}{2}\rho\eta AV^3$, where $\rho$=water density, $\eta$=efficiency of the system (0.33), A=cross-sectional area: (10 ft×1.5 ft=15 ft$^2$), V=flow velocity (15.00 fps), and P=22,176 ft-lb/sec=21 KW.

The efficiency of a cross-axis turbine depends on its tip speed ratio (TSP) which is the ratio of the blade tip speed divided by the flow velocity.

$$TSP=\Omega R/V \qquad (9)$$

where $\Omega$ is the rotational speed in radians per second and R is the radius of the turbine. Assuming the maximum efficiency occurs at a TSP in the 2-3 range and assuming a TSP of 2.5, and a flow velocity of 15.00 fps, the blade tip speed is 37.5 fps. For a 10-ft diameter machine, this corresponds with a rotational speed of 7.5 radians/sec or 72 RPM. Since power is the product of the torque and rotational blade speed, the machine design criteria can be defined in terms of RPM, Power and the torque.

Table 4 summarizes the power output of a cross-flow turbine deployed in the acceleration zone of a flume according to the present invention. Table 4 shows various acceleration zone or throat dimensions and flow depths, as well as the power output for a turbine efficiency of 33% and a flow velocity of 15 fps in the acceleration zone.

TABLE 4

Power Output of Cross-axis Turbines Deployed in Flume

| Channel Characteristics | | | Flume Characteristics | | | Cross-Axis Turbine Characteristics | | |
|---|---|---|---|---|---|---|---|---|
| Upstream Width[5] ft | Upstream Flow Depth ft | Upstream Flow Velocity fps | Acceleration Zone Width[6] ft | Turbine Platform ft × ft | Flow Velocity in Zone[7] fps | Diameter ft | Blade Height ft | Power Output KW |
| 20 | 6 | 3 | 12 | 12 × 12 | 15 | 10 | 1.5 | 21 |
| 32 | 8 | 3 | 20 | 20 × 20 | 15 | 16 | 2.0 | 44 |
| 45 | 8 | 3 | 30 | 30 × 30 | 15 | 26 | 2.0 | 71 |
| 55 | 8 | 3 | 40 | 40 × 40 | 15 | 36 | 2.0 | 98 |
| 65 | 8 | 3 | 50 | 50 × 50 | 15 | 46 | 2.0 | 125 |

[5]For use in trapezoidal channels, the channel width b represents the average width, i.e., b = ($b_1$ + $b_2$)/2 where $b_1$ is the channel width at the top (water line) and $b_2$ is the channel width at the base
[6]For use in trapezoidal channels, the width shown in the table represents the average AV Flume width, i.e., one-half the sum of the flume widths at the top (water line) and at the base.
[7]Design flow velocity The foregoing has described power generation flumes that include a fluid flow acceleration zone in which power generation can be efficiently carried out and the manner of making and using one or multiples thereof. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A kinetic hydropower generation system comprising an open fluid flow canal through which gravity driven fluid flows, a fluid flow directing flume positioned within the open canal so that an entrance is fitted to the width of the open canal, the flume having a bottom and opposing sidewalls forming a fluid flow acceleration zone, a converging entrance and a diverging exit, the acceleration zone being located down stream from the converging entrance, and a power generation assembly positioned within said acceleration zone, the bottom of the flume being raised above the level of a bottom surface of the canal so that fluid flow through the converging entrance is formed into a dynamic hydraulic head upstream from the acceleration zone and causing a downstream flow depth in the acceleration zone to decrease as it flow across the acceleration zone due to velocity increases in the acceleration zone thereby creating super-critical velocities in the acceleration zone to operate the power generation assembly.

2. The kinetic hydropower generation system as in claim 1 wherein at least a portion of the acceleration zone comprises a substantially horizontal platform bounded by side walls.

3. The kinetic hydropower generation system as in claim 1 where the power generation assembly includes a rotor positioned within the flowing fluid moving across the acceleration zone.

4. The kinetic hydropower generation system as in claim 1 wherein the open canal has a rectangular cross-sectional shape.

5. The kinetic hydropower generation system as in claim 1 wherein the open canal has a trapezoidal cross-sectional shape.

6. The kinetic hydropower generation system as in claim 1 wherein the acceleration zone is comprised of a downwardly sloped entrance, a substantially flat horizontal section and an upwardly sloped exit with the sloped entrance having a slope that is 10% greater than the sloped exit.

7. The kinetic hydropower generation system as in claim 1 further including at least a second fluid flow directing flume positioned at a predetermined location along the open fluid flow canal.

8. The kinetic hydropower generation system as in claim 1 wherein the open fluid flow canal includes a plurality of fluid flow directing flumes at spaced apart locations there along.

9. The kinetic hydropower generation system as in claim 8 wherein the plurality of fluid flow directing flumes are located in series along the open fluid flow canal.

10. The kinetic hydropower generation system as in claim 8 wherein the open fluid flow canal is divided into separate fluid flow channels and the plurality of fluid flow directing flume are provided in parallel locations along each of the separate fluid flow channels.

11. The kinetic hydropower generation system as in claim 8 wherein the plurality of flumes are positioned adjacent one another across the width of the open fluid flow canal.

12. A mechanism for kinetic hydropower generation for slow-moving water flowing through an open canal comprising an open flume structure mountable within the open canal and having an inlet, an outlet and being comprised of a bottom and opposing sidewalls, the bottom having a bottom surface for being mounted on a bottom of the open canal, the flume having an interior surface comprised of a plurality of levels, a shaped entrance wall and side walls providing a converging entrance and a diverging outlet so that a dynamic head is created within the water flowing through the flume, a flow acceleration section, located down stream from the converging entrance, in which flow velocities are increased above ambient upstream flow velocities and into super-critical flow velocities, and a power generator assembly positioned within the acceleration section and operated by the flowing water.

13. The mechanism in claim 12 wherein the power generator assembly includes a rotor member positioned to interact with and be driven by the flowing fluid in the acceleration section, said rotor being connected to and driving a power generator supported operatively above the acceleration section.

14. The kinetic hydropower generation system as in claim 1 wherein the acceleration zone is comprised of a first acceleration zone defined by a first downwardly sloped floor member and a first horizontal floor member, and a second acceleration zone, positioned downstream of the first acceleration zone, comprised of a second sloped floor member and a second horizontal floor member and a second power generation assembly positioned within the second acceleration zone.

15. The kinetic hydropower generation system as in claim 14 wherein the second acceleration zone is connected downstream of the first acceleration zone.

16. The kinetic hydropower generation system as in claim 1 wherein the increased flow velocity in the acceleration zone is maintained in a supercritical range.

17. The kinetic hydropower generation system as in claim 1, wherein substantially the entire flow of fluid in the open fluid flow canal is directed through the flume.

18. A kinetic hydropower generator system comprising an open water flow canal, a flume device provided within the open water flow canal through which substantially all water flowing through the open water flow canal will be directed, the flume device having a bottom and opposing side walls forming an independent structure having an entrance, an exit and an acceleration zone, the flume entrance and sidewalls being dimensioned and shaped to form a dynamic hydraulic head in the flowing water adjacent the entrance to produce a downstream transition in water flow velocities from subcritical velocities toward super-critical velocities adjacent the acceleration zone, and a power generation assembly operatively positioned in the acceleration zone and driven by water flowing there through.

19. The kinetic hydropower generator system as in claim 18 wherein all of the water flowing within the canal is directed through the flume.

20. The kinetic hydropower generator system as in claim 18 wherein the water flowing in the open canal is directed to a plurality of spaced apart flumes located within the open canal.

21. The kinetic hydropower generator system as in claim 18 wherein the water flow through the flume achieves within it boundaries a Froude number of the flow that is at least equal to 1.

22. The kinetic hydropower generator system as in claim 18 wherein the water flow through the flume achieves within it boundaries a Froude number of the flow that is greater than 1.

23. The kinetic hydropower generator system. as in claim 18 wherein the velocity within the acceleration zone is increased 3 to 10 times the velocity of the ambient upstream flow velocity.

24. A kinetic hydropower generation system comprising a flume having a base and two opposing side walls that extend from an inlet to an outlet, said two opposing side walls having a section where the opposing side walls are converging following the inlet, said base including a downwardly angled floor section located down stream from the converging side walls and leading to an acceleration zone at least a portion of which is defined by a substantially flat bottom and two substantially parallel side walls, and a power generating assembly operatively positioned within the acceleration zone, the inlet including a raised portion that together with the converging sidewalls create a dynamic upstream head in the water flow, and wherein a downstream flow depth decreases as the flow velocity increases across the acceleration zone to create super-critical flow velocities within the acceleration zone to operate the power generating assembly.

25. A power generating and water flow accelerating flume comprising: an upwardly open flume device for receiving flowing water comprised of a bottom having a shaped upper surface and upwardly extending sidewalls connected to the bottom that collectively define a length and a width of the flume device, the flume device having an entrance including a raised entrance floor and an exit, a converging throat, a flow acceleration zone positioned downstream from the converging throat and having at least a portion thereof at a level lower than the entrance, the flume device creating a dynamic hydraulic head in water flow upstream of the acceleration zone to thereby establish super-critical flow velocities in the fluid flow across the acceleration zone with a Froude number of the fluid flow there through being greater than one, and a power generating assembly located within and operated by the fluid flow across the acceleration zone.

* * * * *